C. J. NELSON.
CLUTCH.
APPLICATION FILED FEB. 19, 1915.
1,235,151.
Patented July 31, 1917.
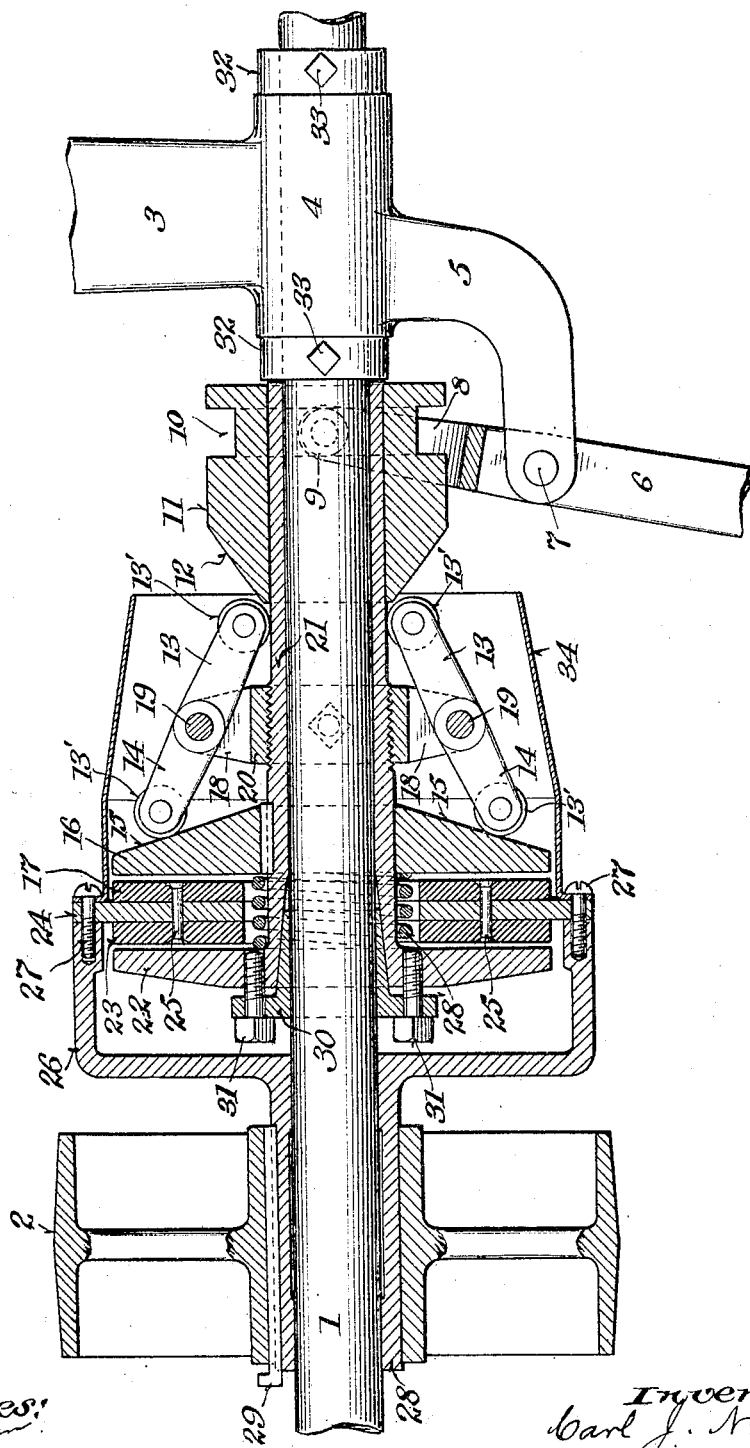
Witnesses:
Inventor:
Carl J. Nelson
By Erwin & Wheeler
Attorneys.

UNITED STATES PATENT OFFICE.

CARL J. NELSON, OF MENOMONEE FALLS, WISCONSIN.

CLUTCH.

1,235,151. Specification of Letters Patent. Patented July 31, 1917.

Application filed February 19, 1915. Serial No. 9,221.

*To all whom it may concern:*

Be it known that I, CARL J. NELSON, a citizen of the United States, residing at the city of Menomonee Falls, county of Waukesha, and State of Wisconsin, have invented new and useful Improvements in Clutches, of which the following is a specification.

My invention relates to improvements in clutches for connecting a pulley with a revoluble shaft, and it pertains to the construction and arrangement of the several coöperating parts, as hereinafter set forth and claimed.

My invention is explained by reference to the accompanying drawing, which represents a longitudinal section thereof supported from a horizontal shaft and hanger, a side view being shown of said shaft and hanger.

Like parts are referred to by the same reference numerals.

1 is a supporting shaft. 2 is a pulley, both of which are of ordinary construction. The shaft 1 is supported from a plurality of hangers 3, one of which is shown. 4 is a journal box for the shaft. The lower side of the journal box 4 is provided with an arm 5 from which the operating lever 6 is pivotally suspended by the bolt 7. The upper end of the operating lever 6 is bifurcated, and each arm 8 of said lever is provided at its ends with a roller 9, indicated in dotted lines, which operates in the annular channel 10 formed in the wedge shaped member 11. By throwing the lower end of the lever 6 to the right the upper end of said lever acting over the pivotal bolt 7 is thrown toward the left, whereby the inwardly converging surface 12 of said wedge shaped member 11 is brought between the inner ends of the levers 13, whereby said ends are thrown outwardly while the opposite ends 14 of said levers are forced against the angular surface 15 of the disk 16, whereby said disk is moved toward the left against the friction bearing disk 17. The respective ends of the lever 13 are each provided with friction bearing pulleys 13'. The lever 13 is pivotally supported from the outer ends of the arms 18 on the pivotal bolts 19, and said arms 18 are formed integral with the sleeve 20, which sleeve 20 has threaded bearings on the tubular member 21, whereby as said disk 16 is forced toward the left it is brought in contact with the friction bearing disk 17.

The disks 17 and 23 are both rigidly connected with the plate 24 by a plurality of bolts 25. The parts 17, 23 and 24 taken together constitute a so-called two faced friction bearing, whereby as the lower end of said lever 6 is thrown toward the right said disk 16 is caused to bear against the disk 17 of said two faced friction bearing, whereby said bearing is forced against the disk 22, and whereby said two faced friction bearing is caused to revolve with the supporting shaft 1. Motion is communicated from the two faced friction bearing to the pulley 2 through the cup shaped member 26. The plate 24 is rigidly secured to said cup shaped member 26 by a plurality of screws 27. The member 26 is loosely connected with the shaft 1 so as to slide longitudinally of said shaft, and also so as to permit said shaft to turn independently of said member through the sleeve 28. The pulley 2 is rigidly secured to the sleeve 28 by the key 29. Thus, it is obvious that by moving the lower end of the lever 6 toward the right the revoluble movement of the shaft 1 will be communicated through the mechanism described to the pulley 2, whereby said pulley will be caused to revolve with the shaft, and vice versa when the lower end of the lever is moved toward the left the wedge shaped member 11 will be brought out from between the opposing ends of the levers 13, whereby said levers 13 will be thrown inwardly toward each other and the shaft 1 by the recoil of the spring 28, which forces the disk 16 toward the right against the rollers 13', whereby the ends of the levers 14 are moved outwardly and the opposite ends of said levers 13 are moved inwardly, as stated, whereby said shaft 1 will be free to revolve without communicating motion to said pulley. The disks 16 and 22 are brought out of contact with the two faced friction bearing by the recoil of said spiral spring 28. The spring 28 is supported from the shaft 1 on the tubular sleeve 21 between said disks 16 and 22, and the tubular member 21 is rigidly secured to and caused to revolve with the shaft 1 by the action of the tapered sleeve 30. Said sleeve 30 is rigidly secured to the disk 22 by a plurality of bolts 31. 32, 32 are collars which are rigidly secured to the shaft 1 by the bolts 33, 33, whereby said shaft is prevented from shifting in the journal bearings 4 as the clutch mechanism is operated. The disks 17 and 23 are preferably formed of fiber or other similar material, whereby the frictional contact of said disks with the opposing disks 16 and 22 is increased. 34 is an annular sleeve which is rigidly secured to the cup shaped member 23 by said screws 27 and said sleeve 34 serves to prevent dust and other refuse matter from accumulating on the clutch mechanism.

While I have shown and described the mechanism as adapted to communicate motion from the shaft 1 to the pulley 2, it will, of course, be obvious that a revoluble motion may, in like manner, be communicated from the pulley 2 to the shaft 1.

Having thus described my invention, what I claim as new and desire to secure by Letters Patent, is:—

In a device of the described class, the combination of a revoluble shaft, a tubular member rigidly secured to said shaft, a cup shaped member revolubly supported on said shaft near one end of said tubular member, a pulley rigidly secured to said cup shaped member, a two faced friction bearing rigidly secured to the edge of said cup shaped member, a pair of friction disks carried by said tubular member and respectively located on two opposing sides of said two faced friction bearing, one of said disks being inclined inwardly toward the operating lever at an angle to said two faced friction bearing and the other disk inclined in the opposite direction, a wedge shaped sleeve slidably mounted on said tubular member, an operating lever connected with said wedge shaped sleeve, a plurality of two armed levers pivotally supported from said tubular member, said wedge shaped sleeve being adapted as it is moved toward the left on said tubular member by said operating lever to raise the inner ends of said two armed levers, whereby their opposing ends are forced against the inclined surfaces of said disk, whereby said inclined disk is forced against one side of said two faced friction bearing, and whereby said two faced friction bearing is forced against the other friction bearing disk, and means for automatically throwing said disks out of contact with said two faced friction bearing when relieved from the action of the operating lever.

In testimony whereof I affix my signature in the presence of two witnesses.

CARL J. NELSON.

Witnesses:
A. J. McKERIHAN,
IRMA D. BREMER.

Copies of this patent may be obtained for five cents each, by addressing the "Commissioner of Patents, Washington, D. C."